United States Patent [19]

Hoxmeier et al.

[11] Patent Number: 5,447,995
[45] Date of Patent: Sep. 5, 1995

[54] METHOD FOR PRODUCING ASYMMETRIC RADIAL POLYMERS

[75] Inventors: Ronald J. Hoxmeier; Bridget A. Spence, both of Houston, Tex.

[73] Assignee: Shell Oil Company, Houston, Tex.

[21] Appl. No.: 250,409

[22] Filed: May 27, 1994

[51] Int. Cl.$^6$ ............... C08F 297/04; C08G 81/02
[52] U.S. Cl. ................. 525/314; 525/99; 525/105; 525/251; 525/270; 525/299
[58] Field of Search ............. 525/314, 299, 105, 271, 525/250, 99

[56] References Cited

U.S. PATENT DOCUMENTS

| | | |
|---|---|---|
| 4,391,949 | 7/1983 | St. Clair . |
| 4,444,953 | 4/1984 | St. Clair ............... 525/98 |
| 4,849,481 | 7/1989 | Rhodes ............... 525/314 |
| 4,879,349 | 11/1989 | Hoxmeier . |
| 4,925,899 | 5/1990 | Rendina ............... 525/314 |
| 5,147,939 | 9/1992 | Hellermann ............... 525/314 |
| 5,212,249 | 5/1993 | Richie et al. . |
| 5,302,667 | 4/1994 | Rhodes ............... 525/250 |
| 5,369,175 | 11/1993 | Hoxmeier ............... 525/99 |

Primary Examiner—Joseph L. Schofer
Assistant Examiner—I. Zemel
Attorney, Agent, or Firm—Donald F. Haas

[57] ABSTRACT

A method for producing asymmetric radial polymers which comprises anionically polymerizing an anionically polymerizable monomer to form a first set of living polymer arms, coupling the first set of living polymer arms with a silicon-based coupling agent, substantially completing the coupling reaction, anionically polymerizing, in the presence of the coupled first set of polymer arms, a different anionically polymerizable monomer(s) to form a second set of living polymer arms, and adding a coupling activator and coupling the second set of living polymer arms to the coupled first set of polymer arms to form the asymmetric radial polymer.

20 Claims, No Drawings

METHOD FOR PRODUCING ASYMMETRIC RADIAL POLYMERS

BACKGROUND OF THE INVENTION

The present invention relates to a method for producing asymmetric radial polymers. More particularly, this invention relates to a one reactor method for producing asymmetric radial polymers of conjugated dienes and/or vinyl aromatic hydrocarbons and also other anionically polymerizable monomers such as acrylic monomers.

Heretofore, several methods have been proposed for preparing asymmetric radial polymers. As is well known in the prior art, radial polymers comprise three or more arms extending outwardly from a nucleus. The asymmetric radial polymers contain arms of at least two different polymers, which polymers may vary as to chemical composition, structure and/or molecular weight. A principal difference in the methods frequently used to prepare asymmetric radial polymers resides in the selection of a coupling agent which forms the nucleus of the radial polymer. Multifunctional coupling agents such as silicon tetrachloride have been used to form asymmetric radial polymers having three or four arms. Star-shaped radial polymers having many more arms have been formed using a poly alkenyl aromatic compound, such as divinyl benzene, as the coupling agent as described in Canadian Patent 716,645.

Before 1988, such asymmetric radial polymers were made by forming a blend of the different polymeric arms in the desired ratio and then adding the coupling agent to couple the arms to the coupling agent. Those methods resulted in a product having, on average, the desired number of each kind of arm in the asymmetric polymer. The problem associated with producing asymmetric polymers in that manner is that the product obtained is actually a statistical distribution of all possible products. Unfortunately, this means that a certain percentage of the polymer produced would constitute a dissymmetric radial polymer containing polymer arms of only one type that could adversely affect the characteristics of the polymer.

In 1988, one of the present applicants filed a patent application which resulted in U.S. Pat. No. 4,879,349. Therein is disclosed a two-reactor process for producing asymmetric radial polymers which avoids the problem of the production of the unwanted homopolydiene polymer and other undesirable species. The process involves separately polymerizing the monomers to create separately the two different types of arms (it was not thought possible to polymerize the arms in the same reactor and still achieve a product which is not a statistical blend). Then one of the polymeric arms is coupled to the coupling agent and when that coupling reaction is complete, the second set of polymer arms is coupled to the coupling agent. This maximizes production of the desired species of asymmetric radial block copolymer. The two-reactor process described above is very advantageous and produces polymers which have very good properties and are useful in adhesive compositions and for a wide variety of other uses. However, the two-reactor process does have the disadvantage that it is more expensive to carry out. It requires additional capital expenditure for a second reactor and additional time to produce the final polymer.

Therefore, it would be very advantageous to have a method which is capable of producing in one reactor an asymmetric radial polymer maximizing the amount of the desired species of polymer which is produced. The present invention provides such a process and produces such a polymer.

SUMMARY OF THE INVENTION

The present invention is a process for producing an asymmetric radial block polymer which comprises:
- (a) anionically polymerizing at least one anionically polymerizable monomer to form a first set of living polymer arms,
- (b) coupling the first set of living polymer arms with a silicon-based coupling agent such as bis(trichlorosilyl)ethane, silicon tetrachloride, hexachlorodisiloxane, etc.,
- (c) substantially completing the coupling reaction,
- (d) anionically polymerizing, in the presence of the coupled first set of polymer arms, a different anionically polymerizable monomer, either by itself or on the ends of uncoupled first polymer arms, or a different set of anionically polymerizable monomers to form a second set of living polymer arms, and
- (e) adding a coupling activator and coupling the second set of living polymer arms to the coupled first set of polymer arms.

In the preferred embodiment, the first set of polymer arms is formed by polymerizing a conjugated diene, preferably isoprene, and the second set of living polymer arms is formed by polymerizing a vinyl aromatic hydrocarbon block, preferably styrene, and then polymerizing a conjugated diene block, preferably an isoprene block. In another preferred embodiment, the first set of arms is formed by polymerizing a conjugated diene and the second set of arms is formed by polymerizing an acrylic monomer, preferably tert-butyl methacrylate. The preferred coupling activators for use in step (e) are ethylene glycol diethyl ether, orthodimethoxybenzene, N,N,N',N'-tetramethylethylenediamine, diethylether, and the like.

DESCRIPTION OF THE INVENTION

In general, the method of this invention may be used to prepare asymmetric radial polymers with any polymer containing a reactive end group which will react with one or more functional groups contained in the selected coupling agent. The method is particularly suitable for the preparation of asymmetric radial polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

In general, the polymers produced with the processes taught in the foregoing patents may be polymers of one or more conjugated dienes containing from 4 to 12 carbon atoms such as 1,3-butadiene, isoprene, piperylene, methyl pentadiene, phenyl butadiene, 3,4-dimethyl-1,3-hexadiene, 4,5-diethyl-1,3-octadiene and the like, preferably those conjugated diolefins containing from 4 to 8 carbon atoms. The polymers produced by these processes may also be copolymers of one or more of the above conjugated diolefins and one or more other monomers, particularly vinyl aromatic hydrocarbon monomers such as styrene, various alkyl substituted styrenes, alkoxy substituted styrenes, vinyl naphthalene and the like. Homopolymers and copolymers of monoalkenyl aromatic hydrocarbons may also be useful as polymer arms in the present invention.

Acrylic monomer polymer arms can also be incorporated. The acrylic monomers used in the composition of the present invention may have the structure $$H_2C=\underset{R_1}{C}-\underset{O}{\overset{\|}{C}}-O-R_2$$

where $R_1$ is hydrogen, phenyl or an alkyl radical which is linear or branched and has from 1 to 10 carbon atoms and $R_2$ is an alkyl radical which has from 1 to 14 carbon atoms, may contain a tertiary amine or an ether linkage and may be a cyclic hydrocarbon.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group must be carried out after reaction of the methacrylate polymer with the coupling agent so as not to interfere with the coupling reaction. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., isobutyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. Tertiary butyl methacrylate (TBMA) is preferred because of ease of purification and polymerization.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric radial polymer of this invention may be prepared by contacting the monomer or monomers with an organoalkali metal compound in a suitable solvent at a temperature within the range from $-150°$ C. to $300°$ C., preferably at a temperature within the range from $0°$ C. to $100°$ C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

The method of the present invention is carried out without resorting to making two different sets of living polymer arms in different reaction vessels and then bringing them together, either at the same time for statistical coupling or sequentially as is described in the prior art discussed above. In this invention, a first set of polymer arms is made by polymerizing at least one anionically polymerized monomer which is then coupled. This first coupling reaction is then allowed to proceed to completion. Next, in the presence of the coupled polymer arms, i.e., the coupled intermediate species, a different anionically polymerizable monomer or set of anionically polymerizable monomers is polymerized to form a second set of living polymer arms. Finally, a coupling activator is added and the second set of living polymer arms is coupled to the coupled first set of polymer arms to form the desired asymmetric radial block copolymer.

The second set of polymer arms may be polymerized entirely from monomers which are added to the reactor after the first coupling step. However, the second set of arms may also be grown from any excess uncoupled first polymer arms which are present in the reactor after coupling and are still living, i.e. still able to react with additional monomer. This is the A⁻Li⁺ species.

In prior methods for making asymmetric radial polymers, it was thought to be impossible to polymerize one of the subsequent set of polymer arms in the presence of the coupling reaction product of prior sets of arms and the coupling agent. It was thought that the subsequent sets of arms would begin to couple quickly with the coupling agent so that the desired arm length could not be achieved and a distribution of arm lengths would result, i.e. a statistical blend. It is quite remarkable and unexpected that the process of the present invention works in the face of this conventional wisdom. We have found that the coupling reaction product of the first set of polymer arms and the coupling agent (represented by $A_2ClSiEthSiClA_2$ where A represents the first set of polymer arms and the ClSiEthSiCl is the residue of the bis(trichlorosilyl)ethane coupling agent) is relatively stable in the presence of excess living polymer arms ($A^-Li^+$) in the absence of the coupling activators. This reaction product is also stable in the presence of living polymer arms which are formed during the second polymerization step. Significant reaction of the $A_2ClSiEthSiClA_2$ coupling reaction product with the second set of living polymer arms will only occur after addition of the coupling activator. It is this unique and novel combination of steps which allows the production of asymmetric radial block copolymers in a one-reactor process.

After the first coupling reaction is completed, some of the coupling sites on the coupling agent are left unreacted and available for further reaction with the second set of living polymer arms. When the coupling activator is added subsequent to the polymerization of the second set of living polymer arms, it activates the coupling reaction by catalyzing the coupling reaction of the second set of arms with the remaining coupling sites (Si-halide groups in the case of silyl halide coupling agents) so that the second set of living polymer arms is coupled to the coupled first set of polymer arms through the unreacted coupling sites on the coupling agent.

The silicon-based coupling agent of the present invention may be $X_3Si$—R—$SiX_3$, $R'SiX_3$, $SiX_4$, $C(R$—$SiX_3)_4$, etc. where R is $(CH_2)_n$, $n>0$, R' is alkyl or aryl, and X is halogen, alkoxy, hydride. Specific examples include bis(trimethoxysilyl)ethane, bis(trichlorosilyl)ethane, 1,6-bis(trichlorosilyl)hexane, and hexachlorodisiloxane, to make 6 armed polymers. Polymers with 3 to 12 arms are also contemplated herein. The preferred coupling agents are bis(trichlorosilyl)ethane and silicon tetrachloride because they give the highest coupling yield. The use of these coupling agents allows the production of the desired 4 or 6 armed asymmetric radial polymers of the present invention. These particular coupling agents are advantageous because when they are used, the coupling reaction will essentially halt before the last X group (usually halide) on each silicon reacts so that a second set of polymer arms can be polymerized in the presence of these partially reacted coupling agent/polymer arm reaction products. The second set of polymer arms can then be coupled to this reaction product by adding the coupling activator (catalyst).

In general, any polar compound known to be suitable for increasing the vinyl content in diolefin polymers will be suitable for use as the coupling activator to increase the activity of the later reacting sites of the coupling agent used in the process of this invention. Suitable polar compounds include the Lewis bases. Suitable polar compounds, then, include ethers, such as diethyl ether, dibutyl ether, tetrahydrofuran, ethylene glycol dimethyl ether, ethylene glycol dibutyl ether, ethylene glycol diethyl ether, diethylene glycol dibutyl ether, dioxane, triethylene glycol ether, 1,2-dimethoxy benzene, 1,2,3-trimethoxy benzene, 1,2,4-trimethoxy benzene, 1,2,3-triethoxy benzene, 1,2,3-tributoxy benzene, 1,2,4-triethoxy benzene and the like. Suitable polar compounds also include tertiary amines such as triethyl amine, tributyl amine, N,N,N',N'-tetramethyl ethylene diamine and the like. Suitable polar compounds include various pyridine and pyrolidene compounds such as dipipyridinoethane, dipyrolidinoethane and the like.

In general, the coupling activator will be used at a concentration within the range from 10 to 1000 ppm. The preferred coupling activators are ethylene glycol diethyl ether, orthodimethoxybenzene, N,N,N',N'-tetramethylethylenediamine, diethylether, and the like, with ethylene glycol diethyl ether being most preferred.

As a general rule, the polymerization of the first set of living polymer arms may be carried out at 20° to 100° C., preferably 50° to 70° C. for 5 to 60 minutes, preferably 30 to 60 minutes. In general, the conditions of the first coupling reaction are 20° to 70° C., preferably 50° to 70° C., and 1 to 60 minutes, preferably 5 to 30 minutes. In general, the conditions of the polymerization of the second set of living polymer arms are 20° to 100° C., preferably 50° to 70° C., for 5 to 60 minutes, preferably 30 to 60 minutes. In general, the conditions of the final coupling reaction are 50° to 80° C., preferably 70° to 80° C., for 10 to 60 minutes, preferably 30 to 60 minutes using 10 to 1000 ppm of the coupling activator.

The asymmetric radial block copolymers of the present invention may have molecular weights varying over a wide range. In general, the molecular weights of these block copolymer arms will range from about 1000 up to as much as 250,000. The preferred block copolymer arms of the present invention fall within the molecular weight range of 1000 to 50,000.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

These polymers may be hydrogenated after they are coupled. They may also be partially hydrogenated such that one portion of the polymer is hydrogenated and another is not. For example, styrene-butadiene arms could be made as well as isoprene arms. It is possible to selectively hydrogenate the butadiene in the styrene-butadiene arms and not significantly hydrogenate the isoprene arms. The hydrogenation can take place in a selective manner with a suitable catalyst and conditions like those described in Reissue 27,145, U.S. Pat. No. 4,001,199 or with a titanium catalyst such as disclosed in U.S. Pat. No. 5,039,755, all of which are incorporated herein by reference.

The asymmetric radial polymers of this invention may be used in any of the applications for which asymmetric radial polymers having the same relative arm structure can be used. Suitable end use applications, then, include impact modification of engineering thermoplastics, impact modification of unsaturated thermosetting polyesters, adhesives, asphalt modification, and the like.

EXAMPLE 1

144 grams of isoprene (I) were polymerized in 1620 grams of cyclohexane with 7.2 millimoles of sec-butyllithium at 60° C. for 60 minutes. Next, the living isoprene polymer arms were coupled with 1.8 millimoles of bis(-trichlorosilyl)ethane ($Cl_3$—Si—Eth—Si—$Cl_3$) at 60° C. for 30 minutes. The intermediate material was analyzed by gel permeation chromatography and it was determined that it was about 80% $I_2ClSiEthSiClI_2$ and about 20% by weight $I_2ClSiEthSiCl_2I$ where I=polyisoprene polymer arms.

After the first coupling step was completed, styrene was polymerized in the presence of the coupled polyisoprene arms. 43.2 grams of styrene and 4.32 millimoles of sec-butyllithium were added to the reaction mixture and the styrene was polymerized at 50 ° C. for 30 minutes. An analysis of this material by gel permeation chromatography showed that the polystyryllithium molecular weight was 7400 with a remarkably low molecular weight distribution (polydispersity) of 1.02. The GPC also showed that less than 2 percent of the PS$^-$Li$^+$ had coupled to the $I_2ClSiEthSiClI_2$ during the polystyrene polymerization reaction. It is remarkable that so little of the PS$^-$Li$^+$ coupled during the polymerization and it is also remarkable that the molecular weight distribution was so narrow for a reaction in which the polymerization took place in the presence of the coupling agent. After the polymerization was completed, 1000 parts per million of ethylene glycol diethyl ether was added to the reaction mixture. The temperature was raised to 80° C. and the coupling reaction allowed to continue for 60 minutes. The coupling reaction was terminated with methanol. The final product was an asymmetric radial coupled block copolymer containing substantially 4 polyisoprene arms and 2 polystyrene arms and 4 polyisoprene arms and 1 polystyrene arm as determined by gel permeation chromatography analysis.

EXAMPLE 2

20 g of isoprene was polymerized in 270 g of cyclohexane with 4 mmoles of s-buLi at 60° C. for 60 minutes. Next 1 mmole of $SiCl_4$ was added without activator and coupled at 50° C. for 15 minutes to give $I_3SiCl$ and I$^-$Li$^+$ with no other apparent products (by GPC). Then 8 g of styrene monomer was added to grow an IS$^-$Li$^+$ block in the presence of $I_3SiCl$ from the excess I$^-$Li$^+$ left after the first coupling step. GPC showed that less than 4 percent coupling had occurred during polymerization of the PS block. After the IS$^-$Li$^+$ polymerization was completed, 1 g of butadiene was added and polymerized at 60° C. for 30 minutes to cap the IS$^-$Li $^+$ with less sterically hindered chain ends (B$^-$Li$^+$) to enhance coupling efficiency for the second coupling step. Then 300 ppm ethyleneglycoldiethylether was added to initiate and catalyze the second coupling step and the solution was reacted at 60° C. for 30 minutes. The final composition of the product by GPC was determined to be less than 50 percent by weight $I_3SiCl$ and substantially equal amounts of the desired products $I_3Si(SI)$ and IS diblock polymer.

EXAMPLE 3

20 g of isoprene in 270 g of cyclohexane was polymerized with 4 mmoles of s-buLi at 60° C. for 60 minutes. Then the living I$^-$Li$^+$ arms were coupled with about 1.33 mmole (Li:Si=3:1) of $SiCl_4$ at 50° C. for 15 minutes to give $I_3SiCl$, $I_2SiCl_2$ and $ISiCl_3$ in about a 2:1:0.5 weight ratio (by GPC). After completion of the first coupling step, 10 g of styrene monomer was added and polymerized at 50° C. for 30 minutes with 1.4 mmoles of s-buLi in the presence of the partially coupled products resulting from the first coupling step. Less than 17 percent coupling of the growing PS$^-$Li$^+$ chains to the partially coupled intermediate occurred during polymerization of the PS$^-$Li$^+$ block (by GPC). Then 1 g of butadiene was added to cap the PS$^-$Li$^+$ with butadienyl$^-$Li$^+$ chain ends. Then 300 ppm ethyleneglycol-diethylether was added to initiate and catalyze the second coupling step which was reacted at 60° C. for 30 minutes. GPC analysis of the final product showed that virtually all of the final product contained a PS block with a composition of $I_3SiS$, $I_2SiS_2$, and $ISiS_3$ in substantially the same ratio noted for the product of the first coupling step.

EXAMPLE 4

16 g of isoprene in 64 g of cyclohexane was polymerized with s-BuLi to give I$^-$Li$^+$ with MW=18,000. This was coupled with $SiCl_4$ without activator (Li:Si=2:1) to give $I_2SiCl_2$ whose composition was determined by GPC to be 41 weight percent $I_2SiCl_2$, 46 percent $ISiCl_3$ and 13 percent $I_3SiCl$. To this was added 10.7 g of TBMA (tertiarybutylmethacrylate) monomer and 10.6 ml of an initiator solution obtained by reacting 16 mmoles of 1,1-diphenylethylene with 6 mmoles of s-butyllithium at 60° C. for 3 hours in 60 ml of cyclohexane. This initiator solution contains 0.1 mmoles of initiator per ml of solution.

The TBMA was polymerized for 5 minutes at ambient temperature in the presence of $I_2SiCl_{12}$ to give TBMA$^-$Li$^+$. Then 1000 ppm diethyleneglycol diethylether was added to activate and catalyze the second coupling step (coupling of TBMA$^-$Li$^+$ to $I_2SiCl_2$) and the coupling reaction was allowed to proceed 30 minutes at 70° C. The final solution was coagulated into acetone to remove TBMA homopolymer and the asymmetric radial polymer was collected by filtration and dried. Proton NMR analysis showed the product to contain about 14 percent by weight grafted poly-TBMA.

EXAMPLE 5

Initiator synthesis for PS-PTBMA block copolymer arms for second coupling step was carried out as follows. Three grams of styrene in 100 g of cyclohexane was polymerized with 3 mmoles of s-buLi at 50° C. for 30 minutes. GPC showed the PS$^-$Li$^+$ initiator =1000 MW.

One-pot synthesis of PI-PS-PTMA asymmetric radial polymer is described next. In reactor A, 20 g of isoprene in 80 g of cyclohexane was polymerized with 2.5 mmoles of s-BuLi at 60° C. for 1 hour. This was coupled (without activator) with 1.25 mmoles $SiCl_4$ (Li:Si=2:1) to give $I_2SiCl_2$. GPC analysis showed the composition to be about 65 percent by weight $I_2SiCl_2$ with the remaining 33 percent comprising approximately equal quantities of $ISiCl_3$ and $I_3SiCl$. To this solution was added 15 g of TBMA monomer and all of the PS$^-$Li$^+$ initiator solution described above. The TBMA was allowed to polymerize for 5 minutes at ambient temperature. A GPC sample of this solution showed the PS-PTBMA block to have polystyrene equivalent MW=1900 versus 1000 MW for PS block alone.

1000 ppm of diethyleneglycol diethylether was then added to activate and catalyze the second coupling step and the solution was coupled at 60° C. for 30 minutes. The final solution was coagulated into acetone to remove ungrafted PS-PTBMA and the PI-(PS-PTBMA) asymmetric radial polymer was collected by filtration and dried. GPC analysis showed that there was no ungrafted PS-PTBMA arms in the purified product and also showed (UV detector) that all three components of $I_2SiCl_2$ (namely, $I_2SiCl_2$, $ISiCl_3$, and $I_3SiCl$) had a substantial amount of PS-PTBMA block copolymer arms grafted to the first coupling step products.

We claim:

1. A method for producing an asymmetric radial polymer which comprises:
    (a) polymerizing at least one anionically polymerizable monomer to form a first set of living polymer arms,
    (b) coupling the first set of living polymer arms with a silicon-based coupling agent,
    (c) substantially completing the coupling reaction such that some of the coupling sites on the coupling agent are left unreacted,
    (d) anionically polymerizing, in the presence of the coupled first set of polymer arms, a different anionically polymerizable monomer, either by itself or on the ends of uncoupled first polymer arms, or a different set of anionically polymerizable monomers to form a second set of living polymer arms, and
    (e) adding a coupling activator and coupling the second set of living polymer arms through the unreacted coupling sites on the coupling agent to the coupled first set of polymer arms to form an asymmetric radial polymer.

2. The method of claim 1 wherein the coupling agent is selected from the group consisting of $X_3Si-R-SiX_3$, $R'SiX_3$, $SiX_4$, and $C(R-SiX_3)_4$, where R is $(CH_2)_n$, n>0, R' is alkyl or aryl, and X is halogen, alkoxy, or hydride.

3. The method of claim 2 wherein the coupling agent is selected from the group consisting of bis(trichlorosilyl)ethane and silicon tetrachloride.

4. The method of claim 1 wherein the coupling activator is selected from the group consisting of ethylene glycol diethyl ether, orthodimethoxybenzene, N,N,N',N'-tetramethylethylenediamine, and diethylether.

5. The method of claim 1 wherein the first and second set of polymer arms are comprised of styrene, isoprene, or both.

6. The method of claim 5 wherein the coupling agent is $X_3Si-R-SiX_3$.

7. The method of claim 5 wherein the first set of polymer arms are polyisoprene and the second set of polymer arms are block copolymers of isoprene and styrene.

8. The method of claim 1 wherein the first set of polymer arms is comprised of a block copolymer of styrene and isoprene and/or butadiene and the second set of polymer arms is comprised of an acrylic monomer.

9. The method of claim 8 wherein the acrylic monomer is an alkyl methacrylate.

10. The method of claim 1 wherein step (a) is carried out at a temperature of 20° C. to 100° C. for from 5 to 60 minutes; step (b) is carried out at a temperature of from 20° C. to 70° C for 1 to 60 minutes; step (d) is carried out at a temperature of from 20° C. to 100° C. for 5 to 60 minutes; and step (e) is carried out at a temperature of 50° C. to 80° C. for 10 to 60 minutes.

11. A method for producing an asymmetric radial block copolymer of a conjugated diene and/or a vinyl aromatic hydrocarbon which comprises:
    (a) anionically polymerizing a conjugated diene and/or a vinyl aromatic hydrocarbon to form a first set of living polymer arms,
    (b) coupling the first set of living polymer arms with a silicon-based coupling agent,
    (c) substantially completing the coupling reaction such that some of the coupling sites on the coupling agent are left unreacted,
    (d) anionically polymerizing, in the presence of the coupled first set of polymer arms, a different conjugated diene or vinyl aromatic hydrocarbon, or any conjugated diene and a vinyl aromatic hydrocarbon, or an acrylic monomer to form a second set of living polymer arms, and
    (e) adding a coupling activator and coupling the second set of living polymer arms through the unreacted coupling sites on the coupling agent to the coupled first set of polymer arms to form an asymmetric radial polymer.

12. The method of claim 11 wherein the coupling agent is selected from the group consisting of $X_3Si-$ —R—SiX$_3$, R'SiX$_3$, SiX$_4$, and C(R—SiX$_3$)$_4$, where R is (CH$_2$)$_n$, $n \geq 0$, R' is alkyl or aryl, and X is halogen, alkoxy, or hydride.

13. The method of claim 12 wherein the coupling agent is selected from the group consisting of bis(trichlorosilyl)ethane and silicon tetrachloride.

14. The method of claim 11 wherein the coupling activator is selected from the group consisting of ethylene glycol diethyl ether, orthodimethoxybenzene, N,N,N',N'-tetramethylethylenediamine, and diethylether.

15. The method of claim 11 wherein the first and second set of polymer arms are comprised of styrene, isoprene, or both.

16. The method of claim 15 wherein the coupling agent is X$_3$Si—R—SiX$_3$.

17. The method of claim 11 wherein the first set of polymer arms is comprised of a block copolymer of styrene and isoprene and/or butadiene and the second set of polymer arms is comprised of an acrylic monomer.

18. The method of claim 17 wherein the acrylic monomer is an alkyl methacrylate.

19. The method of claim 11 wherein step (a) is carried out at a temperature of 20° C. to 100° C. for from 5 to 60 minutes; step (b) is carried out at a temperature of from 20° C. to 70° C. for 1 to 60 minutes; step (d) is carried out at a temperature of from 20° C. to 100° C. for 5 to 60 minutes; and step (e) is carried out at a temperature of 50° C. to 80° C. for 10 to 60 minutes.

20. A method for producing an asymmetric radial polymer which comprises:
 (a) polymerizing at least one anionically polymerizable monomer to form a first set of living polymer arms,
 (b) coupling the first set of living polymer arms with a silicon-based coupling agent,
 (c) substantially completing the coupling reaction such that some of the coupling sites on the coupling agent are left unreacted,
 (d) anionically polymerizing, in the presence of the coupled first set of polymer arms, a different anionically polymerizable monomer or group of anionically polymerizable monomers to form a second set of living polymer arms, and
 (e) adding a coupling activator and coupling the second set of living polymer arms through the unreacted coupling sites on the coupling agent to the coupled first set of polymer arms to form an asymmetric radial polymer.

* * * * *